United States Patent
Day et al.

(10) Patent No.: US 7,240,182 B2
(45) Date of Patent: Jul. 3, 2007

(54) SYSTEM AND METHOD FOR PROVIDING A PERSISTENT FUNCTION SERVER

(75) Inventors: Michael Norman Day, Round Rock, TX (US); Mark Richard Nutter, Austin, TX (US); VanDung Dang To, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 10/942,432

(22) Filed: Sep. 16, 2004

(65) Prior Publication Data

US 2006/0095718 A1 May 4, 2006

(51) Int. Cl.
*G06F 9/40* (2006.01)
(52) U.S. Cl. .................................................. 712/34
(58) Field of Classification Search .............. 712/34; 709/216, 213, 211, 205; 718/105, 106
See application file for complete search history.

(56) References Cited

U.S. PATENT DOCUMENTS

| | | | | |
|---|---|---|---|---|
| 4,402,046 A | * | 8/1983 | Cox et al. | 709/213 |
| 5,233,701 A | * | 8/1993 | Nakata | 711/153 |
| 5,261,095 A | * | 11/1993 | Crawford et al. | 717/149 |
| 5,410,655 A | * | 4/1995 | Greenfield et al. | 710/5 |
| 5,428,781 A | * | 6/1995 | Duault et al. | 718/102 |
| 5,457,797 A | * | 10/1995 | Butterworth et al. | 719/320 |
| 5,706,514 A | * | 1/1998 | Bonola | 718/104 |
| 5,841,431 A | * | 11/1998 | Simmers | 345/211 |
| 6,295,571 B1 | * | 9/2001 | Scardamalia et al. | 710/308 |
| 6,526,491 B2 | | 2/2003 | Suzuoki et al. | 711/164 |
| 6,559,854 B2 | | 5/2003 | Oka et al. | 345/619 |
| 2001/0002130 A1 | | 5/2001 | Suzuoki | 345/420 |
| 2002/0046229 A1 | | 4/2002 | Yutaka et al. | 709/102 |
| 2002/0060690 A1 | | 5/2002 | Tanaka et al. | 345/619 |
| 2002/0095523 A1 | | 7/2002 | Shimakawa et al. | 709/316 |
| 2002/0135582 A1 | | 9/2002 | Suzuoki et al. | 345/502 |
| 2002/0138637 A1 | | 9/2002 | Suzuoki et al. | 709/230 |
| 2002/0138701 A1 | | 9/2002 | Suzuoki et al. | 711/154 |
| 2002/0138707 A1 | | 9/2002 | Suzuoki et al. | 711/163 |
| 2002/0156993 A1 | | 10/2002 | Suzuoki et al. | 712/30 |
| 2003/0055984 A1 | | 3/2003 | Shimakawa et al. | 709/316 |

* cited by examiner

*Primary Examiner*—Eric Coleman
(74) *Attorney, Agent, or Firm*—VanLeeuwen & VanLeeuwen; D'Ann N. Rifai (57) ABSTRACT

A system and method for providing a persistent function server is provided. A multi-processor environment uses an interface definition language (idl) file to describe a particular function, such as an "add" function. A compiler uses the idl file to generate source code for use in marshalling and de-marshalling data between a main processor and a support processor. A header file is also created that corresponds to the particular function. The main processor includes parameters in the header file and sends the header file to the support processor. For example, a main processor may include two numbers in an "add" header file and send the "add" header file to a support processor that is responsible for performing math functions. In addition, the persistent function server capability of the support processor is programmable such that the support processor may be assigned to execute unique and complex functions.

20 Claims, 7 Drawing Sheets

SYSTEM AND METHOD FOR PROVIDING A PERSISTENT FUNCTION SERVER

BACKGROUND OF THE INVENTION

1. Technical Field

The present invention relates in general to a system and method for providing a persistent function server. More particularly, the present invention relates to a system and method for providing a support processor that is persistently programmed to support a particular software application's requirements in a heterogeneous processor environment.

2. Description of the Related Art

Computer systems are becoming more and more complex. The computer industry typically doubles the performance of a computer system every 18 months (e.g. personal computer, PDA, gaming console). In order for the computer industry to accomplish this task, the semiconductor industry produces integrated circuits that double in performance every 18 months. A computer system uses integrated circuits for particular functions based upon the integrated circuits' architecture. Two fundamental architectures are 1) microprocessor-based and 2) digital signal processor-based.

An integrated circuit with a microprocessor-based architecture is typically used to handle control operations whereas an integrated circuit with a digital signal processor-based architecture is typically designed to handle signal-processing manipulations (i.e. mathematical operations). As technology evolves, the computer industry and the semiconductor industry realize the importance of using both architectures, or processor types, in a computer system design.

Many computer systems use a multi-processor architecture in order to provide a substantial amount of processing power while attempting to support a wide range of software applications. For example, many computer systems use a math co-processor to perform particular functions, such as adding and subtracting two numbers. A challenge found, however is that these co-processors are hardwired to perform specific functions, regardless of what an application requires.

In addition, these co-processors are designed to support a broad range of software applications. A challenge found with this approach, however, is that these processors do not perform unique, complex tasks. For example, if a software program wishes to add one million numbers, the software program individually adds the numbers together instead of performing parallel addition processing operations in order to minimize time. As computers begin incorporating a multi-processor type, or heterogeneous, computer architecture, a challenge found is customizing one of the processor types to perform unique and complex tasks in order to support another processor type.

What is needed, therefore, is a system and method to provide a support processor in a heterogeneous processor environment that is persistently programmed based upon a software application's requirements.

SUMMARY

It has been discovered that the aforementioned challenges are resolved by using an interface definition language (idl) file to dynamically describe functions and specify a processor type for executing each function's corresponding instruction. A compiler uses an idl file to generate source code for use in marshalling and de-marshalling data between a first processor type and a second processor type. A header file is created whereby the first processor type includes parameters in the header file, and sends the header file to the second processor type, which is assigned to perform the function. For example, a first processor type may include two numbers in an "add" header file and send the "add" header file to the second processor type, which is responsible for performing math functions.

An application includes a plurality of instructions that correspond to particular functions (e.g. add, subtract, etc.) whereby each instruction is executed on a particular processor type that share a common memory area (e.g. a first processor type or a second processor type). The first processor type is a main processor and is responsible for executing the application. The second processor type is different than the first processor type, and supports the first processor type by executing particular instructions that are included in an application. For example, the application may include an instruction to add one million numbers together. In this example, the second processor type may be programmed to add one million numbers together using a parallel addition approach.

Prior to execution, each of the application's instructions is compiled in a manner that is based upon which processor type is assigned to execute the instruction (e.g. first processor type or second processor type). Instructions that are compiled for the second processor type are sent to the second processor type, in which the second processor type makes persistently available for the application. Instruction identifiers are included in an interface definition language (idl) file for instructions that are sent to the second processor type.

While executing the application, the first processor type identifies instructions in the application and accesses the instruction identifiers that are included in the idl file in order to determine whether the instructions are executed on either the first processor type or the second processor type. When the first processor type identifies an instruction to execute on the second processor type, the first processor type generates a message and sends the message to the second processor type. The message includes the instruction and may include a pointer. The pointer corresponds to a location in a shared memory that includes data for which the second processor type uses during instruction execution. For example, an instruction may correspond to adding one million numbers to each other and the pointer corresponds to the location at which the numbers are located. In one embodiment, instead of including a pointer, the message may include the data itself.

The second processor type receives the message from the first processor type, uses the instruction to identify a corresponding function, and uses the pointer to locate and retrieve the data from the shared memory area. Using the retrieved data, the second processor type executes the function and stores the result in the shared memory area.

In turn, the second processor type sends an acknowledgement that informs the first processor type that it is finished executing the instruction. In addition, the acknowledgement may include a shared memory location (e.g. a pointer) that corresponds to the location of the result of executing the instruction. The first processor type receives the acknowledgement and retrieves the result from the shared memory area for use in further processing.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
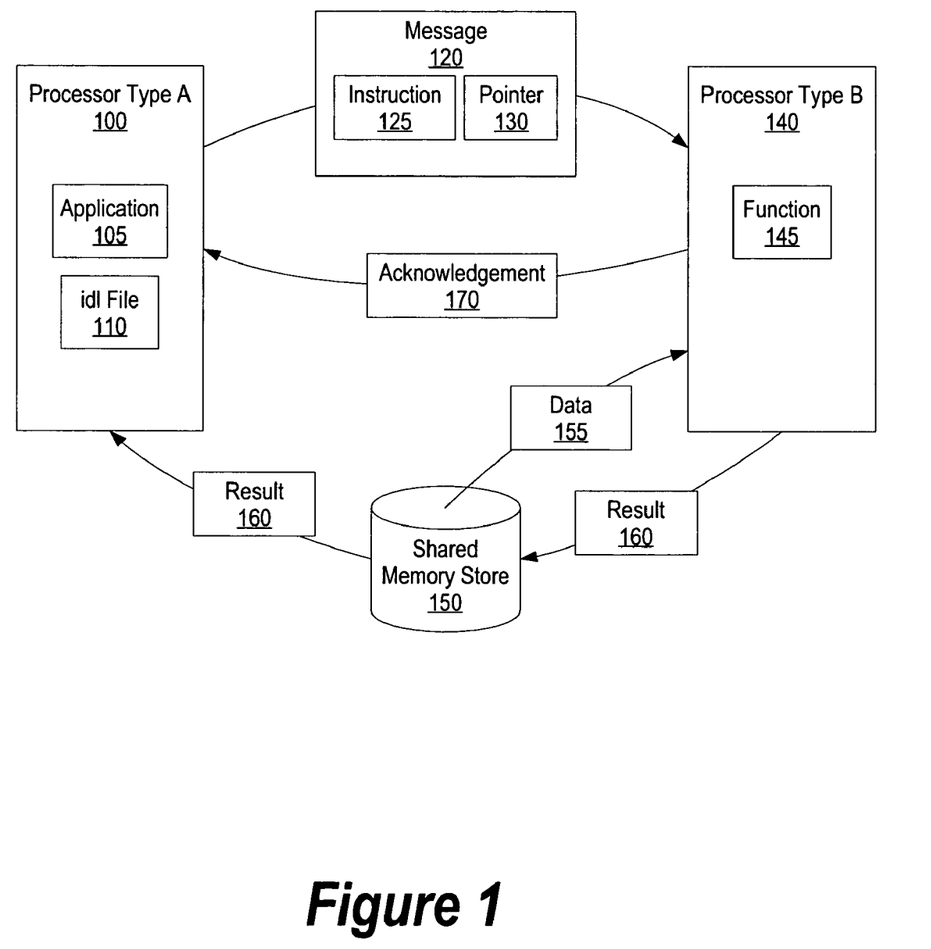
FIG. 1 is a diagram showing a first processor type sending a message to a second processor type that is programmed to execute a particular instruction using shared memory.

FIG. 1 is a diagram showing a first processor type sending a message to a second processor type that is programmed to execute a particular instruction using shared memory. An application includes a plurality of instructions that correspond to particular functions (e.g. add, subtract, etc.) whereby each instruction is executed on a particular processor type, such as processor type A 100 or processor type B 140. Both processor type A 100 and processor type B 140 are able to access shared memory store 150. Shared memory store 150 may be stored on a nonvolatile storage area, such as a computer hard drive.

Processor type A 100 is a main processor and is responsible for executing application 105. Processor type B 140 is a different processor type than processor type A 100 and supports processor type A 100 by executing particular instructions that are included in application 105. For example, application 105 may have an instruction to add one million numbers together. In this example, processor type B 140 may be responsible for executing the particular instruction. Prior to execution, each function is compiled based upon which processor type its corresponding instruction will execute. Identifiers corresponding to instructions that should be executed on processor type B 140 are included in interface definition language (idl) file 110.

While executing application 105, processor type A 100 identifies instructions in application 105 and uses interface definition language (idl) file 110 to determine whether the instructions should be executed on either processor type A 100 or processor type B 140. When processor type A 100 identifies an instruction to execute on processor type B 140, processor type A 100 generates message 120 and sends message 120 to processor type B 140. Message 120 includes instruction 125 and pointer 130. Instruction 125 corresponds to the particular instruction to execute. Pointer 130 corresponds to a location in shared memory 150 that includes data for which processor type B 140 uses during instruction execution. For example, an instruction may correspond to adding one million numbers to each other, whereby the pointer corresponds to the location at which the numbers are located.

Processor type B 140 receives message 120, and uses instruction 125 to identify a corresponding function, such as function 145. Processor type B 140 uses pointer 130 to locate data 155 and retrieve it from shared memory store 150. Using data 155, processor type B 140 executes function 145 and stores the result (i.e. result 160) in shared memory store 150.

Processor type B 140 sends acknowledgement 170 to processor type A 100, informing processor type A 100 that processor type B 140 is finished instruction execution. In addition, acknowledgement 170 includes a memory location corresponding to result 160. Processor type A 100 receives acknowledgement 170 and retrieves result 160 from shared memory store 150.

Figure 2:
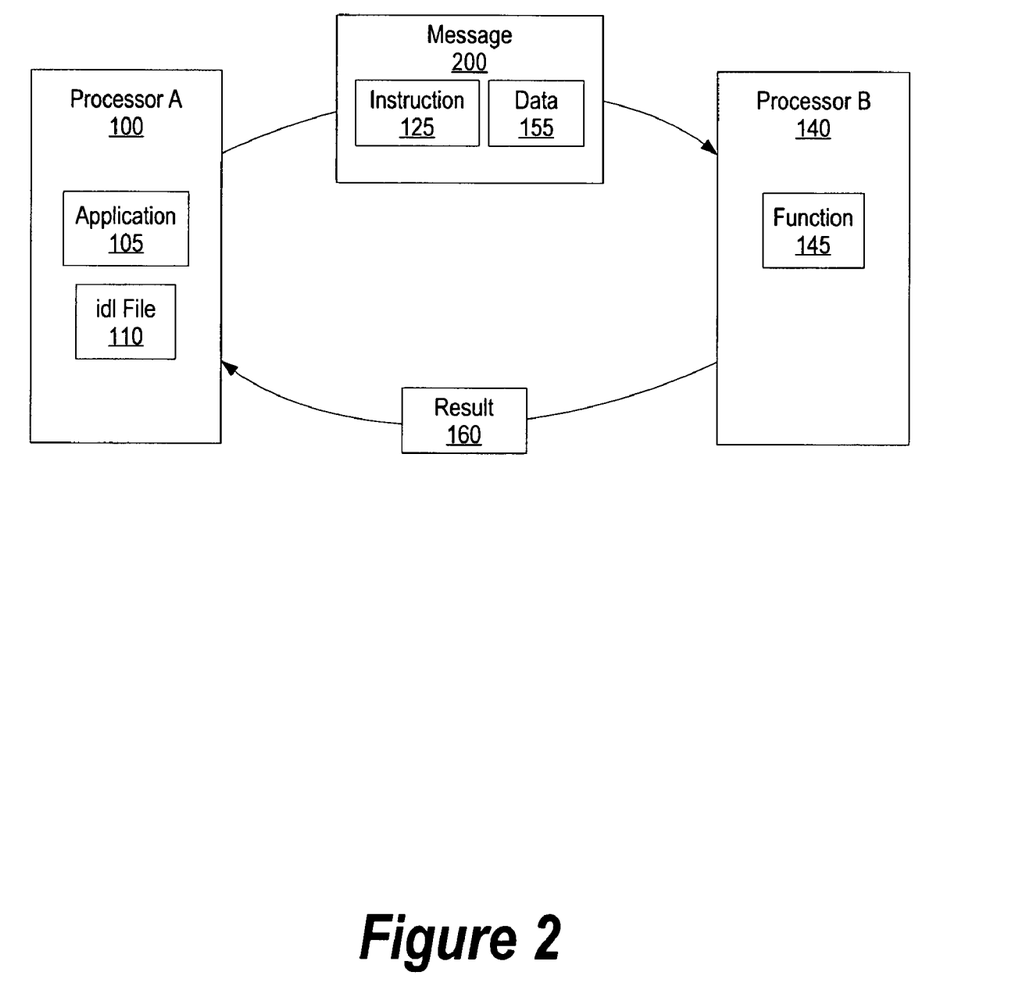
FIG. 2 is a diagram showing a first processor type sending a message that includes data to a second processor type that is programmed to execute a particular instruction.

FIG. 2 is a diagram showing a first processor type sending a message that includes data to a second processor type that is programmed to execute a particular instruction. FIG. 2 is similar to FIG. 1 with the exception that processor type A 100 sends data 155 directly to processor type B 140 instead of sending a pointer, such as that shown in FIG. 1. Processor type A 100, processor type B 140, and data 155 are the same as that shown in FIG. 1.

Processor type B 140 receives message 200 and extracts data 155. Using instruction 125, processor type B 140 identifies function 145 and executes function 145 using data 155. The result (i.e. result 160) is sent directly to processor type A 100. Instruction 125, function 145, and result 160 are the same as that shown in FIG. 1.

Figure 3:
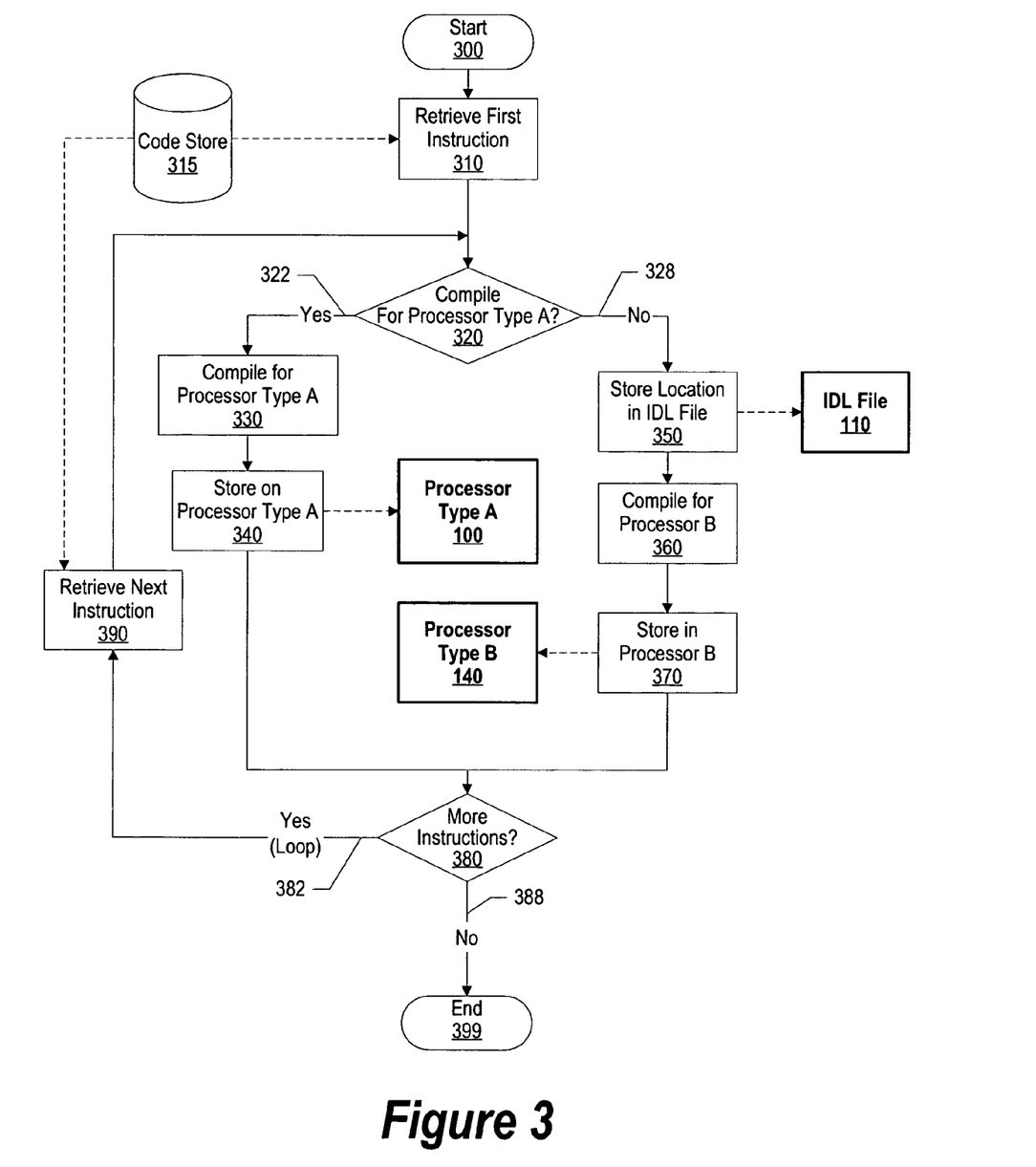
FIG. 3 is a flowchart showing steps taken in compiling code for a function based upon a corresponding processor type.

FIG. 3 is a flowchart showing steps taken in compiling code for functions based upon a corresponding processor type. An application includes a plurality of functions (e.g. add, subtract, etc.) whereby each of the functions is executed on a particular processor type, such as processor type A 100 or processor type B 140. Prior to application execution, processing identifies a processor type for each function, and compiles the function to execute on the identified processor type. Processor type A 100 and processor type B 140 are the same as that shown in FIG. 1.

Processing commences at 300, whereupon processing retrieves a first instruction from code store 315 that is included in the application (step 310). A determination is made as to whether to compile the instruction's corresponding function for execution on processor type A 100 or processor type B 140 (decision 320). If the function should be compiled for processor type A 100, decision 320 branches to "Yes" branch 322 whereupon processing compiles the function for processor type A 100 (step 330), and stores the compiled code on processor type A 100 at step 340.

Figure 4:
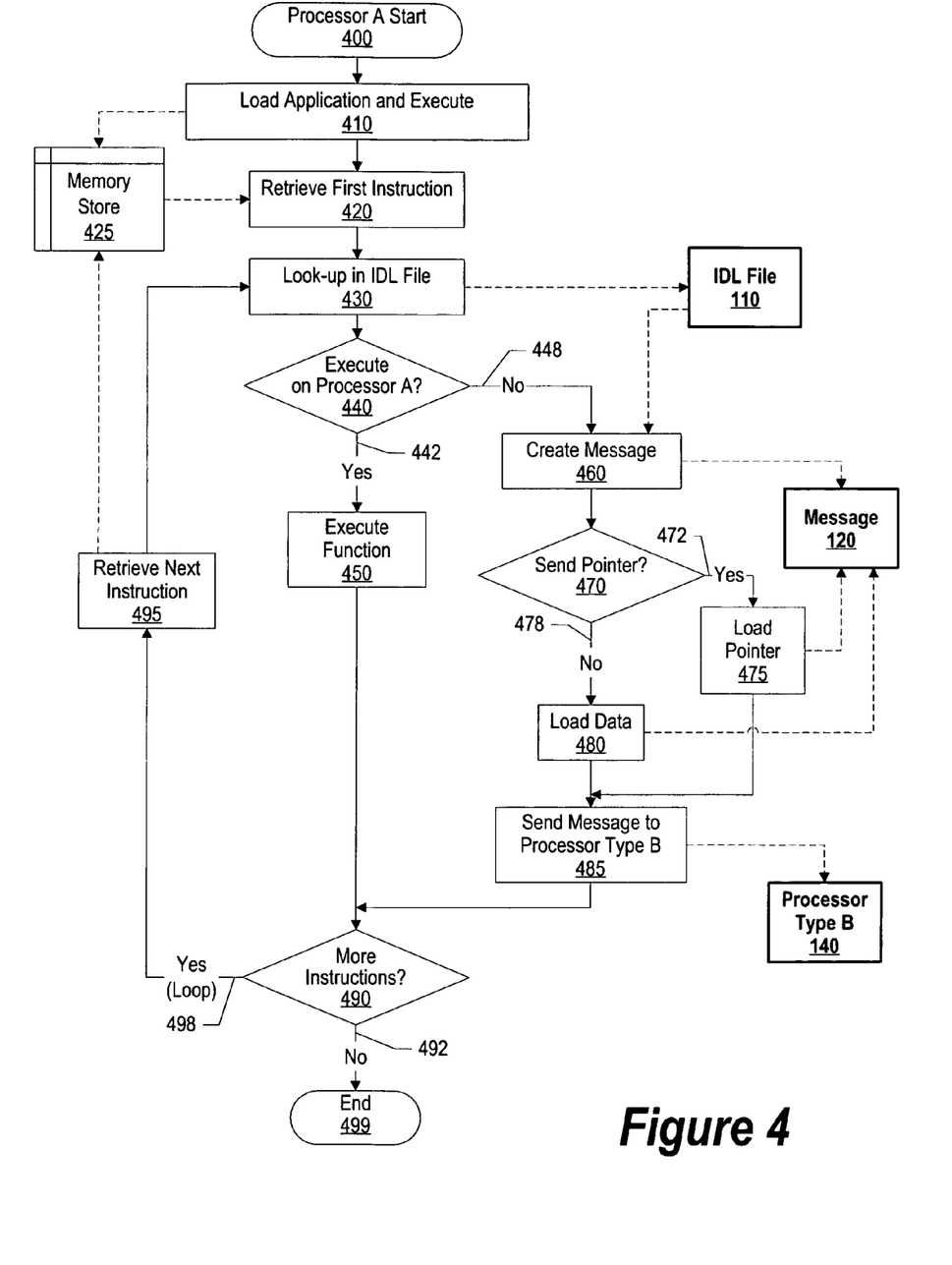
FIG. 4 is a flowchart showing steps taken in sending a message to a second processor type to execute a function.

On the other hand, if the function should be compiled for processor type B 140, decision 320 branches to "No" branch 328 whereupon processing stores the location at which the function should be executed (e.g. processor type B 140) in idl file 110 (step 350) such that processor type A 100 is able to determine whether to execute the function itself or whether to send a message to processor type B 140 to execute the function (see FIG. 4 and corresponding text for further details regarding function execution). Idl file 110 is the same as that shown in FIG. 1. Processing compiles the function for use on processor type B at step 360, and stores the compiled code on processor type B 140 at step 370.

A determination is made as to whether there are more instructions to compile (decision 380). If there are more instructions to compile, decision 380 branches to "Yes" branch 382 which loops back to retrieve (step 390) and process the next instruction. This looping continues until there are no more instructions to process, at which point decision 380 branches to "No" branch 388 whereupon processing ends at 399.

In one embodiment, a particular processor type may execute particular types of functions. For example, if processor type A 100 is microprocessor-based and processor type B 140 is digital signal processor-based, processor type B 140 may execute a majority of mathematical type instructions that are included in an application.

FIG. 4 is a flowchart showing steps taken in sending a message to a second processor type to execute an instruction. A first processor type, such as processor type A 100 shown in FIG. 1, initiates and executes an application. During application execution, particular instructions included in the application are executed on a second processor type, such as processor type B 140. The first processor type sends messages to the second processor type, which instructs processor type B 140 to execute the instruction. Processor type B 140 is the same as that shown in FIG. 1.

Processing commences at 400, whereupon processing loads the application into memory store 425 and starts application execution (step 410). Memory store 425 may be stored on a volatile memory location, such as internal memory. At step 420, processing retrieves a first instruction from memory store 425. For example, the first instruction may add one million numbers together. At step 430, processing looks-up the instruction in idl file 110 in order to identify which processor type to execute the function that corresponds to the particular instruction. A determination is made as to whether the instruction should be executed on processor type A 100 or processor type B 140 (decision 440). If the instruction should be executed on processor type A 100, decision 440 branches to "Yes" branch 442 whereupon processor type A 100 executes the function at step 450.

On the other hand, if the instruction should be executed on processor type B 140, decision 440 branches to "No" branch 448 whereupon processing creates message 120 at step 460. In one embodiment, message 120 is an interface definition language (idl) header file. Message 120 is the same as that shown in FIG. 1.

A determination is made as to whether to include a pointer in message 120 that corresponds to the instruction's data location or whether to include the data itself in message 120 (decision 470). For example, if the instruction is to add one million numbers together, processing may wish to send a pointer that corresponds to the location of the numbers as opposed to sending the numbers themselves to processor type B 140. If processing should include a pointer in message 120, decision 470 branches to "Yes" branch 472 whereupon processing loads the pointer in message 120 at step 475. On the other hand, if processing should include the data in message 120, decision 470 branches to "No" branch 478 whereupon processing loads the data in message 120 at step 480. At step 485, processing sends message 120 to processor type B 140.

A determination is made as to whether there are more instructions in the program to execute (decision 490). If there are more instructions to execute, decision 490 branches to "Yes" branch 492 which loops back to retrieve (step 495) and process the next instruction. This looping continues until there are no more instructions to execute, at which point decision 490 branches to "No" branch 498 whereupon processing ends at 499.

Figure 5:
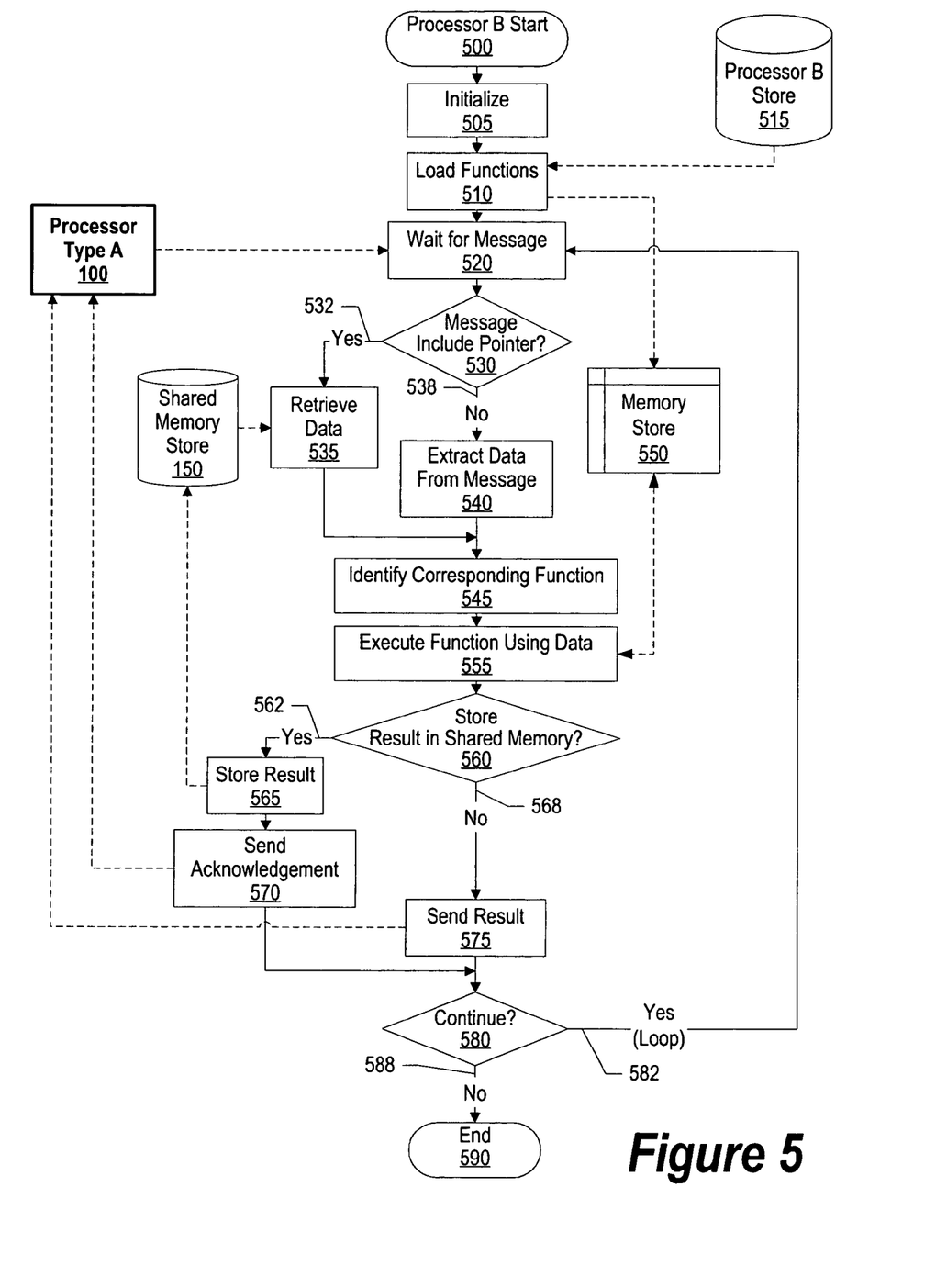
FIG. 5 is a flowchart showing steps taken in receiving a message from a first processor type and executing a function on a second processor type.

FIG. 5 is a flowchart showing steps taken in receiving a message from a first processor type and executing a function on a second processor type. The second processor type, such as processor type B 140 shown in FIG. 1, received compiled code that corresponds to particular functions. When the first processor type, such as processor type A 100 shown in FIG. 1, identifies an instruction to be executed on the second processor type, the first processor type sends a message to the second processor type to execute the function (see FIG. 3 and corresponding text for further details regarding code compilation).

Processing commences at 500, whereupon processor type B 140 initializes at step 505. Processor type B 140 loads functions from processor B store 515 at step 510. For example, one of the functions may be a customized function to add one million numbers together. Processor B store 515 may be stored on a nonvolatile storage area, such as a computer hard drive.

At step 520, processor type B waits for a message from processor type A 100 to execute an instruction. When processor type B 140 receives a message, a determination is made as to whether the message includes a pointer corresponding to a data location or whether the message includes the data itself (decision 530). For example, if processor type B 140 should add one million numbers together, processor type A 100 may send a pointer that corresponds to the location of the numbers as opposed to including all one million numbers in the message (see FIG. 4 and corresponding text for further details regarding the inclusion of a pointer in a message).

If the message includes a pointer, decision 530 branches to "Yes" branch 532 whereupon processor type B 140 uses the pointer to retrieve data from shared memory store 150 (step 535). Shared memory store 150 is shared between processor type A 100 and processor type B 140 and is the same as that shown in FIG. 1. On the other hand, if the message includes the data itself, decision 530 branches to "No" branch 538 whereupon processor type B 140 extracts the data from the message at step 540.

At step 545, processor type B 140 identifies a function in memory store 550 that corresponds to the instruction that is included in the message, and executes the function using the data (step 555). A determination is made as to whether to store the result of the function execution in shared memory (decision 560). For example, if processor type A 100 sent a pointer to processor type B, processor type B may wish to store the result in shared memory 150 and send a corresponding pointer back to processor type A 100.

If processor type B 140 should store the result in shared memory 150, decision 560 branches to "Yes" branch 562 whereupon processing stores the result in shared memory 150 at step 565. Processor type B 140 sends an acknowledgement to processor type A 100, which includes the memory location (e.g. pointer) of the result. On the other hand, if processor type B 140 should send the result directly to processor type A 100, processing branches to "No" branch 568 whereupon processor type B 140 sends the result to processor type A 100 at step 575.

A determination is made as to whether to continue processing (decision 580). If processing should continue, decision 580 branches to "Yes" branch 582 which loops back to process more messages. This looping continues until processing should stop, at which point decision 580 branches to "No" branch 588 whereupon processing ends at 590.

Figure 6:
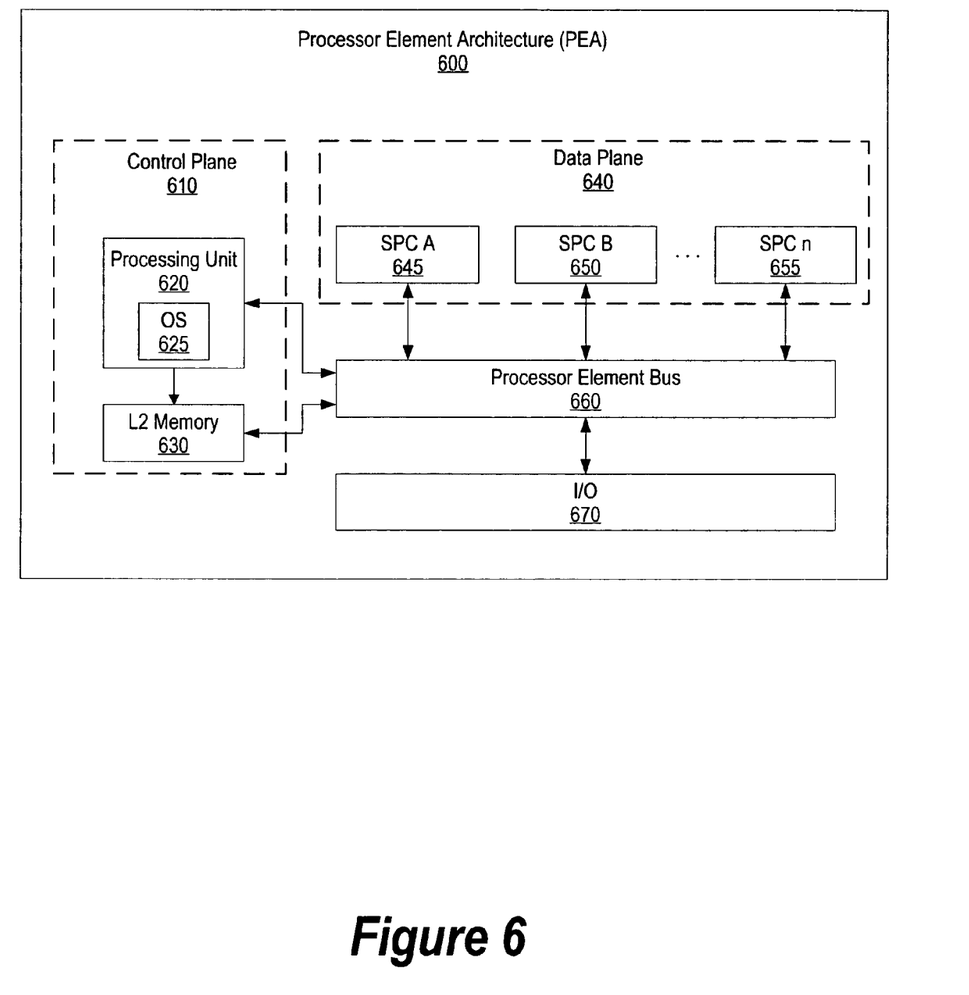
FIG. 6 is a diagram showing a processor element architecture that includes a plurality of heterogeneous processors.

FIG. 6 is a diagram showing a processor element architecture that includes a plurality of heterogeneous processors. The heterogeneous processors share a common memory and a common bus. Processor element architecture (PEA) 600 sends and receives information to/from external devices through input output 670, and distributes the information to control plane 610 and data plane 640 using processor element bus 660. Control plane 610 manages PEA 600 and distributes work to data plane 640.

Control plane 610 includes processing unit 620 which runs operating system (OS) 625. For example, processing unit 620 may be a Power PC core that is embedded in PEA 600 and OS 625 may be a Linux operating system. Processing unit 620 manages a common memory map table for PEA 600. The memory map table corresponds to memory locations included in PEA 600, such as L2 memory 630 as well as non-private memory included in data plane 640 (see FIG. 7A, 7B, and corresponding text for further details regarding memory mapping).

Data plane 640 includes Synergistic Processing Complex's (SPC) 645, 650, and 655. Each SPC is used to process data information and each SPC may have different instruction sets. For example, PEA 600 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU) which is a processing core, such as a digital signal processor, a microcontroller, a microprocessor, or a combination of these cores.

SPC 645, 650, and 655 are connected to processor element bus 660 which passes information between control plane 610, data plane 640, and input/output 670. Bus 660 is an on-chip coherent multi-processor bus that passes information between I/O 670, control plane 610, and data plane 640. Input/output 670 includes flexible input-output logic which dynamically assigns interface pins to input output controllers based upon peripheral devices that are connected to PEA 600. For example, PEA 600 may be connected to two peripheral devices, such as peripheral A and peripheral B, whereby each peripheral connects to a particular number of input and output pins on PEA 600. In this example, the flexible input-output logic is configured to route PEA 600's external input and output pins that are connected to peripheral A to a first input output controller (i.e. IOC A) and route PEA 600's external input and output pins that are connected to peripheral B to a second input output controller (i.e. IOC B).

Figure 7A:
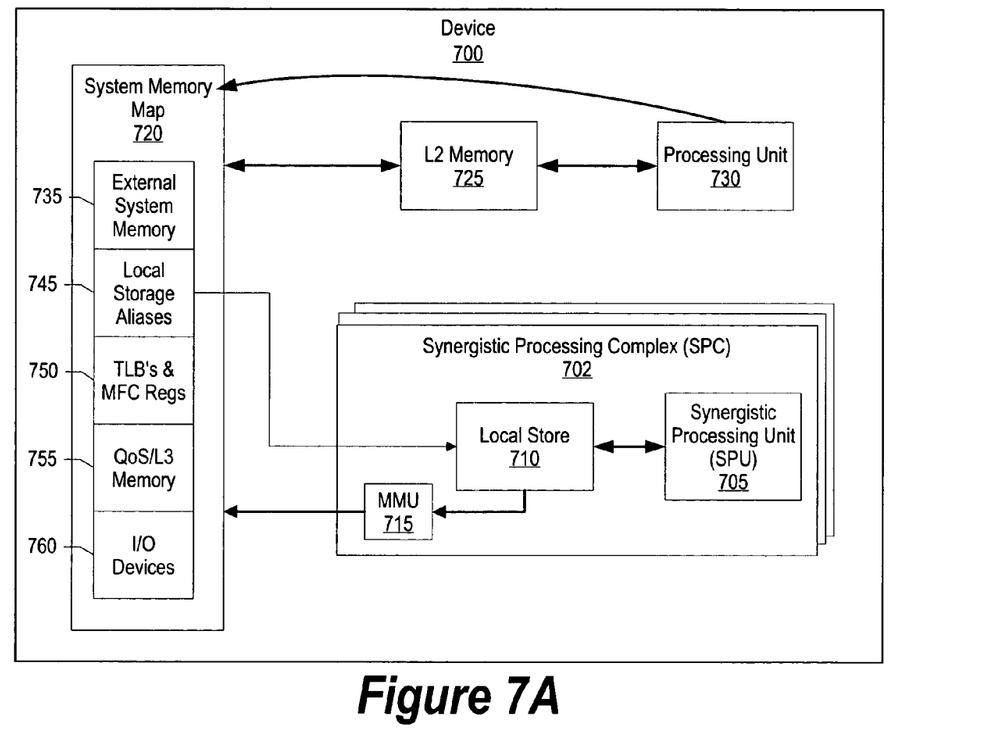
FIG. 7A is a block diagram of an information handling system capable of implementing the present invention.

FIG. 7A illustrates an information handling system which is a simplified example of a computer system capable of performing the computing operations described herein. The example in FIG. 7A shows a plurality of heterogeneous processors using a common memory map in order to share memory between the heterogeneous processors. Device 700 includes processing unit 730 which executes an operating system for device 700. Processing unit 730 is similar to processing unit 620 shown in FIG. 6. Processing unit 730 uses system memory map 720 to allocate memory space throughout device 700. For example, processing unit 730 uses system memory map 720 to identify and allocate memory areas when processing unit 730 receives a memory request. Processing unit 730 access L2 memory 725 for retrieving application and data information. L2 memory 725 is similar to L2 memory 630 shown in FIG. 6.

System memory map 720 separates memory mapping areas into regions which are regions 735, 745, 750, 755, and 760. Region 735 is a mapping region for external system memory which may be controlled by a separate input output device. Region 745 is a mapping region for non-private storage locations corresponding to one or more synergistic processing complexes, such as SPC 702. SPC 702 is similar to the SPC's shown in FIG. 6, such as SPC A 645. SPC 702 includes local memory, such as local store 710, whereby portions of the local memory may be allocated to the overall system memory for other processors to access. For example, 1 MB of local store 710 may be allocated to non-private storage whereby it becomes accessible by other heterogeneous processors. In this example, local storage aliases 745 manages the 1 MB of nonprivate storage located in local store 710.

Region 750 is a mapping region for translation lookaside buffer's (TLB's) and memory flow control (MFC registers. A translation lookaside buffer includes cross-references between virtual address and real addresses of recently referenced pages of memory. The memory flow control provides interface functions between the processor and the bus such as DMA control and synchronization.

Region 755 is a mapping region for the operating system and is pinned system memory with bandwidth and latency guarantees. Region 760 is a mapping region for input output devices that are external to device 700 and are defined by system and input output architectures.

Synergistic processing complex (SPC) 702 includes synergistic processing unit (SPU) 705, local store 710, and memory management unit (MMU) 715. Processing unit 730 manages SPU 705 and processes data in response to processing unit 730's direction. For example SPU 705 may be a digital signaling processing core, a microprocessor core, a micro controller core, or a combination of these cores. Local store 710 is a storage area that SPU 705 configures for a private storage area and a non-private storage area. For example, if SPU 705 requires a substantial amount of local memory, SPU 705 may allocate 100% of local store 710 to private memory. In another example, if SPU 705 requires a minimal amount of local memory, SPU 705 may allocate 10% of local store 710 to private memory and allocate the remaining 90% of local store 710 to non-private memory (see FIG. 7B and corresponding text for further details regarding local store configuration).

The portions of local store 710 that are allocated to non-private memory are managed by system memory map 720 in region 745. These non-private memory regions may be accessed by other SPU's or by processing unit 730. MMU 715 includes a direct memory access (DMA) function and passes information from local store 710 to other memory locations within device 700.

Figure 7B:
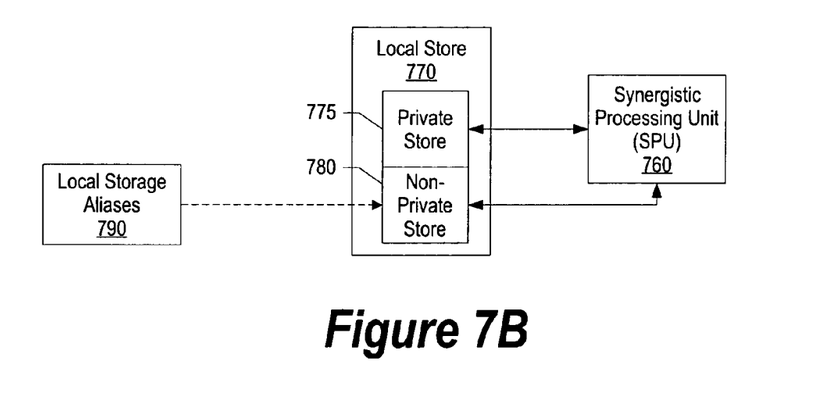
FIG. 7B is a diagram showing a local storage area divided into private memory and non-private memory.

FIG. 7B is a diagram showing a local storage area divided into private memory and non-private memory. During system boot, synergistic processing unit (SPU) 760 partitions local store 770 into two regions which are private store 775 and non-private store 780. SPU 760 is similar to SPU 705 and local store 770 is similar to local store 710 that are shown in FIG. 7A. Private store 775 is accessible by SPU 760 whereas non-private store 780 is accessible by SPU 760 as well as other processing units within a particular device. SPU 760 uses private store 775 for fast access to data. For example, SPU 760 may be responsible for complex computations that require SPU 760 to quickly access extensive amounts of data that is stored in memory. In this example, SPU 760 may allocate 100% of local store 770 to private store 775 in order to ensure that SPU 760 has enough local memory to access. In another example, SPU 760 may not require a large amount of local memory and therefore, may allocate 10% of local store 770 to private store 775 and may allocate the remaining 90% of local store 770 to non-private store 780.

A system memory mapping region, such as local storage aliases 790, manages portions of local store 770 that are allocated to non-private storage. Local storage aliases 790 is similar to local storage aliases 745 that is shown in FIG. 7A. Local storage aliases 790 manages non-private storage for each SPU and allows other SPU's to access the non-private storage as well as a device's control processing unit.

While the computer system described in FIGS. 6, 7A, and 7B are capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   retrieving an instruction using a first processor type, the instruction corresponding to a function;
   in response to retrieving the instruction, accessing an interface definition language file and locating, within the interface definition file, an instruction identifier that corresponds to the instruction;
   in response to locating the instruction identifier in the interface definition language file, selecting a second processor type that is programmed to perform the function, whereby the first processor type and the second processor type share a memory; and
   in response to selecting the second processor type, sending a message to the second processor type to execute the function.

2. The method of claim 1 wherein the message includes a pointer that corresponds to a memory location in the shared memory, the memory location including data for use in executing the function.

3. The method of claim 2 wherein the second processor type is adapted to retrieve the data from the memory location and store a result from the function execution in the shared memory.

4. The method as described in claim 3 wherein the second processor type is further adapted to send an acknowledgement to the first processor type wherein the acknowledgement includes the location of the result in the shared memory.

5. The method of claim 1 further comprising:
   retrieving the function;
   determining that the function should be executed on the second processor type;
   in response to determining that the function should be executed on the second processor type, storing the location identifier in the interface definition language file;
   compiling the function for use on the second processor type in response to the determination; and
   sending the compiled function to the second processor type.

6. The method of claim 1 wherein the message is based upon a function definition included in the interface definition language file.

7. The method of claim 1 wherein the first processor type is a processing unit and the second processor type is a synergistic processing unit.

8. A program product comprising:
   computer operable storage medium having computer program code, the computer program code being effective to:
   retrieve an instruction using a first processor type, the instruction corresponding to a function;
   in response to retrieving the instruction, access an interface definition language file and locating, within the interface definition file, an instruction identifier that corresponds to the instruction;
   in response to locating the instruction identifier in the interface definition language file, select a second processor type that is programmed to perform the function, whereby the first processor type and the second processor type share a memory; and
   in response to selecting the second processor type, send a message to the second processor type to execute the function.

9. The program product of claim 8 wherein the message includes a pointer that corresponds to a memory location in the shared memory, the memory location including data for use in executing the function.

10. The program product of claim 9 wherein the second processor type is adapted to retrieve the data from the memory location and store a result from the function execution in the shared memory.

11. The program product as described in claim 10 wherein the second processor type is further adapted to send an acknowledgement to the first processor type wherein the acknowledgement includes the location of the result in the shared memory.

12. The program product of claim 8 wherein the computer program code is further effective to:
retrieve the function;
determine that the function should be executed on the second processor type;
in response to determining that the function should be executed on the second processor type, store the location identifier in the interface definition language file;
compile the function for use on the second processor type in response to the determination; and
send the compiled function to the second processor type.

13. The program product of claim 8 wherein the message is based upon a function definition included in the interface definition language file.

14. The program product of claim 8 wherein the first processor type is a processing unit and the second processor type is a synergistic processing unit.

15. An information handling system comprising:
a display;
a plurality of processor types;
a shared memory accessible by the plurality of processor types;
one or more nonvolatile storage devices accessible by the plurality of processor types; and
an instruction management tool for managing application instructions, the instruction management tool comprising software code effective to:
retrieve an instruction from one of the nonvolatile storage devices using a first processor type from the plurality of processor types, the instruction corresponding to a function;
in response to retrieving the instruction, access an interface definition language file from one of the nonvolatile storage devices and locating, within the interface definition file, an instruction identifier that corresponds to the instruction;
in response to locating the instruction identifier in the interface definition language file, select a second processor type from the plurality of processor types that is programmed to perform the function; and
in resronse to selecting the second processor type, send a message over a processor bus to the second processor type to execute the function.

16. The information handling system of claim 15 wherein the message includes a pointer that corresponds to a memory location in the shared memory, the memory location including data for use in executing the function.

17. The information handling system of claim 16 wherein the second processor type is adapted to retrieve the data from the memory location and store a result from the function execution in the shared memory.

18. The information handling system as described in claim 17 wherein the second processor type is further adapted to send an acknowledgement to the first processor type wherein the acknowledgement includes the location of the result in the shared memory.

19. The information handling system of claim 15 wherein the software code is further effective to:
retrieve the function from one of the nonvolatile storage devices;
determine that the function should be executed on the second processor type;
in response to determining that the function should be executed on the second processor type, store the location identifier in the interface definition language file;
compile the function for use on the second processor type in response to the determination; and
send the compiled function to the second processor type over a processor bus.

20. The information handling system of claim 15 wherein the message is based upon a function definition included in the interface definition language file.

* * * * *